June 8, 1965 R. H. COLLEY 3,187,817
POWER PLANT, E.G. FOR GROUND EFFECT AIRCRAFT
Filed Oct. 3, 1963 3 Sheets-Sheet 1
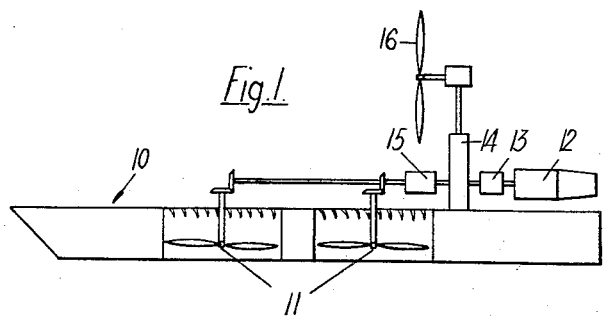
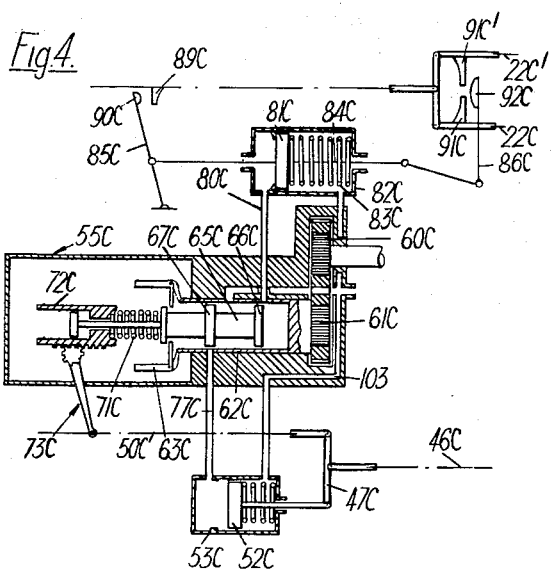
Inventor
ROWAN HERBERT COLLEY
By
Cushman, Darby & Cushman
Attorneys

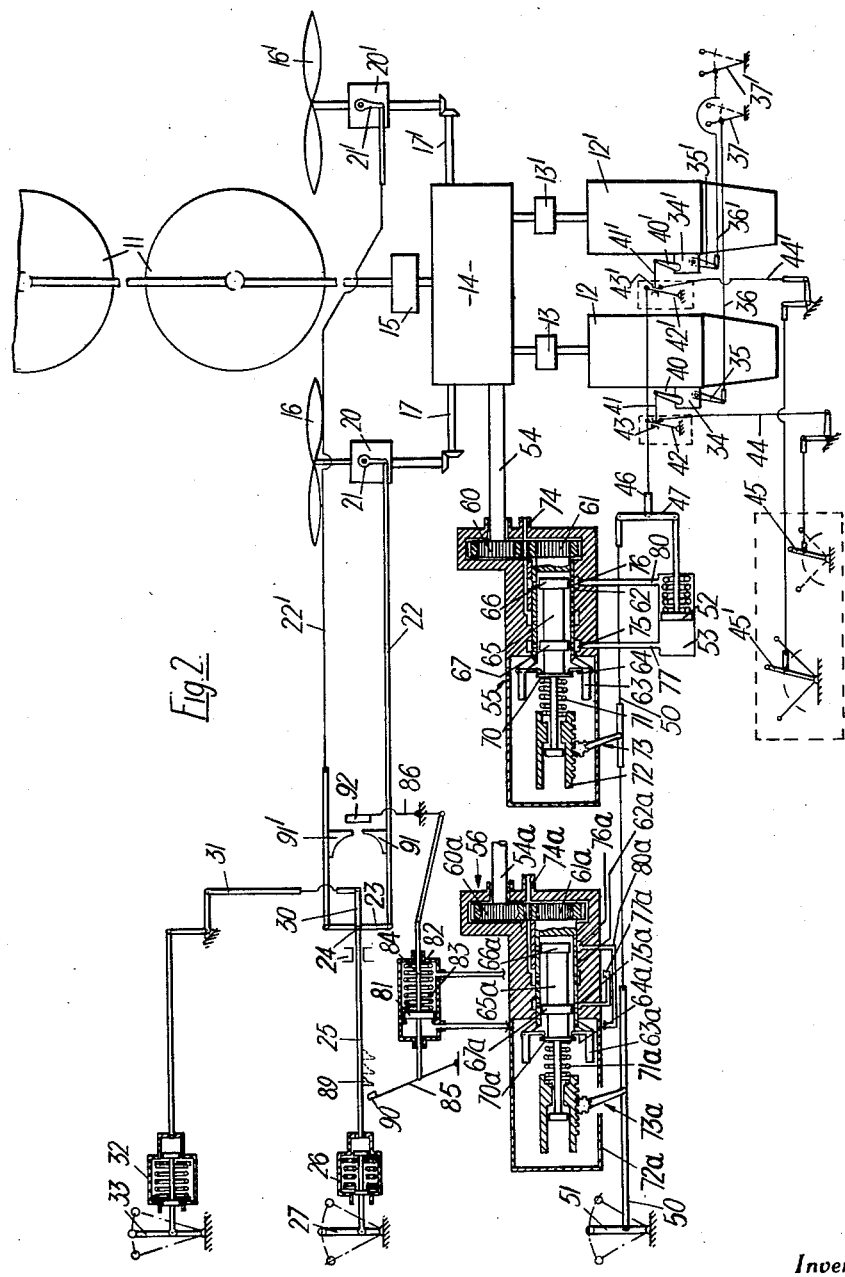

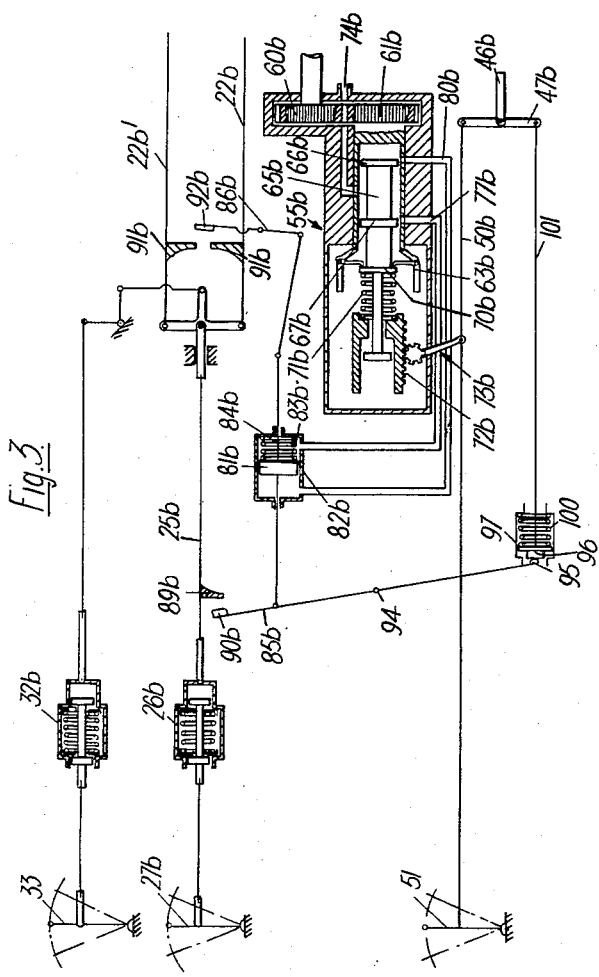

United States Patent Office 3,187,817
Patented June 8, 1965

3,187,817
POWER PLANT, E.G. FOR GROUND EFFECT AIRCRAFT
Rowan Herbert Colley, Sunny Hill, Derby, England, assignor to Rolls-Royce Limited, Derby, England, a company of Great Britain
Filed Oct. 3, 1963, Ser. No. 313,617
Claims priority, application Great Britain, Oct. 15, 1962, 39,013
7 Claims. (Cl. 170—135.2)

This invention concerns power plant, e.g. for ground effect aircraft.

According to the present invention, there is provided power plant comprising one or more engines which is or are arranged to supply power for the operation of two separate devices, power control means which tend in operation to maintain the speed of the engine or engines at a predetermined value, and power reduction means for reducing the amount of power supplied by the engine or engines to one only of the said two devices whenever the speed of the engine or engines falls to a predetermined extent below the said predetermined value, whereby the power supply to the other said device may be maintained substantially constant.

Preferably the said one device is adapted to effect propulsion of a ground effect aircraft, and the said other device is adapted to provide an air cushion for the ground effect aircraft. Thus the said one device is preferably constituted by one or more variable pitch propellers whose pitch is reduced by the power reduction means whenever the said speed falls to the said predetermined extent.

The said other device preferably comprises one or more lift fans.

The power control means preferably comprise speed responsive means at least part of which controls the fuel supply to the engine or engines in dependence upon the rotational speed of the engine or engines, at least part of the speed responsive means being connected to the power reduction means by a lost motion connection or the like such that the power reduction means is moved by the speed responsive means only when the rotational speed of the engine or engines has fallen to the said predetermined extent.

Thus the said speed responsive means, or at least the said part thereof, may control the position of a ram which itself controls the said fuel supply. The said ram may, if desired, also move the said lost motion connection or the like.

Alternatively, the speed responsive means, or different parts thereof, may control the positions of two rams one of which controls the said fuel supply and the other of which moves the said lost motion connection or the like. In this case, the speed responsive means may, if desired, comprise two governors which respectively control the positions of the said two rams.

The speed responsive means is preferably arranged to adjust a valve member which controls the supply of an hydraulic liquid to opposite faces of the respective ram or rams, the engine or engines being arranged to drive a pump for pressurising the said hydraulic liquid supply.

The invention also includes a ground effect aircraft provided with power plant as set forth above.

The invention is illustrated, merely by way of example, in the accompanying drawings, in which:

FIGURE 1 is a diagrammatic sectional elevation of a ground effect aircraft provided with power plant according to the present invention, FIGURE 2 is a diagrammatic plan view, partly in section, of the power plant shown in FIGURE 1, and FIGURES 3 and 4 are diagrammatic sectional views showing modifications of the power plant shown in FIGURE 2.

Terms such as "left," "right," "clockwise," should be understood to refer to directions as seen in the drawings.

Referring to the drawings, a ground effect aircraft 10 (e.g. that known as the "Hovercraft") has two lift fans 11 which are adapted to provide the aircraft with its air cushion. The lift fans 11 are arranged to be driven, by two gas turbine engines 12, 12′ through free-wheels 13, 13′, a common gearbox 14, and a common clutch 15.

The aircraft 10 is provided with two variable pitch propellers 16, 16′ which are adapted to effect forward propulsion of the aircraft. The propellers 16, 16′ are provided with a reverse pitch control which allows the propeller blades to move into reverse pitch in order to effect reverse movement of the aircraft. The propellers 16, 16′ are driven from the gear box 14 by shafting 17, 17′ respectively.

The pitch of the blades of the propellers 16, 16′ may respectively be varied by pitch control units 20, 20′. The latter have levers 21, 21′ respectively which are respectively connected to links 22, 22′. The links 22, 22′ are respectively pivotally connected to opposite ends of a link 23 which is itself pivoted at 24 to a link 25. The link 25 is connected, by way of a spring box 26 to a pitch control lever 27. The pitch control lever 27 is movable in a clockwise direction from a maximum forward pitch position and through a zero pitch position to a reverse pitch position, such movement of the pitch control lever 27 causing corresponding alteration of the pitch of the propellers 16, 16′.

The link 23 has an arm 30 rigidly connected to it, the arm 30 being connected, by way of a linkage 31 and spring box 32, to a yaw control lever 33. Movement of the yaw control lever 33 causes pivotal movement of the link 23 about the pivot 24 and therefore causes differential adjustment of the pitch of the blades of the propellers 16, 16′.

The engines 12, 12′ are respectively provided with fuel supply control units 34, 34′ each of which includes a shut-off cock (not shown). The said shut-off cocks are respectively operated by levers 35, 35′ which are respectively connected by links 36, 36′ to manually operable shut-off cock levers 37, 37′.

The fuel supply control units 34, 34′ are respectively provided with fuel supply control levers 40, 40′ which are respectively connected by links 41, 41′ to trim control levers 42, 42′. The links 41, 41′ are connected to the levers 42, 42′ by way of slides 43, 43′ respectively, the slides 43, 43′ acting to vary the leverage between a common link 46 and the links 41, 41′. The levers 41, 41′ are respectively connected by linkages 44, 44′ to trim levers 45, 45′ which may, for example, be moved clockwise by an operator (in accordance with ambient conditions) from a "rich fuel mixture" position to a "weak fuel mixture" position.

The levers 42, 42′ are connected to the common link 46 which is pivotally connected to the mid-region of a link 47. One end of the link 47 is connected, by way of a link 50, to a power control lever 51 which may, for example, be moved by an operator in a clockwise direction from a maximum power position and through a "cruise" position (shown in full lines) to an idling position. The other end of the link 47 is connected to a piston 52 of a ram 53.

The gear box 14 drives shafts 54, 54a of a fuel governing unit 55 and of an underspeed unit 56 respectively. The units 55, 56 are generally similar to each other and for this reason the unit 56 will not be further described in detail. The parts of the unit 56 which correspond to like parts in the unit 55 have, however, been marked in FIG. 2 with the same reference numerals but with the addition of the suffix *a*.

The unit 55 comprises a gear wheel 60 which is mounted on the shaft 54 and which meshes with a gear wheel 61. The latter is mounted at the right hand end of a sleeve member 62 which is provided with governor weights 63, having arms 64.

Mounted within the sleeve member 62 is a valve member 65. The latter is provided with two spaced apart lands 66, 67 and with an end flange 70 against which act the governor arms 64. The valve member 65 is spring loaded towards the right by means of a spring 71 which bears against and extends between the flange 70 and a movable abutment member 72. The abutment member 72 is movable by the link 50 by way of a rack and pinion device 73.

The gear wheels 60, 61 act as a gear pump in an oil conduit 74, the oil conduit 73 communicating with the space between the lands 66, 67. The sleeve member 62 is provided with outlet ports 75, 76 which are respectively controlled by the lands 67, 66. The outlet port 75 communicates with a conduit 77 which communicates with the left hand side of the piston 52. The outlet port 76 communicates with a conduit 80 which communicates with the right hand side of the piston 52.

It will therefore be appreciated that the position of the valve member 65 controls the position of the piston 52 and hence the fuel supply to the engines 12, 12'. Since, however, the valve member 65 will be moved by the governor weights 63, the unit 55 will tend to control the fuel supply to the engines 12, 12' in such a way as to maintain the latter at a predetermined rotational speed whose value depends on the loading on the spring 71.

The conduits 77a, 80a of the unit 56 respectively communicate with the right and left hand sides of a piston 81 of a ram 82. The piston 81, which is urged towards the left by a spring 83 is mounted on a piston rod 84. The left and right hand ends of the piston rod 84 are pivotally connected to levers 85, 86 respectively.

The link 25 is provided with an abutment member 89 which may be engaged by an abutment member 90 on the lever 85 when the piston rod 84 is moved towards the right. The links 22, 22' are also respectively provided with abutment members 91, 91' which may be engaged by an abutment member 92 on the lever 86 when the piston rod 84 is moved towards the right.

It will be appreciated that the position of the valve member 65a controls the position of the piston 81. In practice manufacturing and setting variations make it impossible for the two units 55, 56 to control at exactly the same speed, and since it is not possible for the underspeed unit 56 to be set to control at a higher r.p.m., than the fuel governing unit 55 (as this would tend to bring the propellers to zero pitch and the fuel supply trimmed simultaneously) then a small margin between the two settings has to be made, and the range of r.p.m. covering the margin is the range over which the engine speed can vary. This margin may be in the region of 500 r.p.m. The arrangement may therefore be such that if the rotational speed of the engines 12, 12' falls to say 500 revolutions per minute below the predetermined rotational speed to which the unit 55 attempts to control it then (assuming that the propellers 16, 16' have forward pitch applied to their blades) the abutment member 90 will be brought into engagement with the abutment member 89 and the link 25 will be moved towards the right whereby to reduce the pitch of the blades of the propellers 16, 16', and hence reduce the power required to drive the propellers. If, on the other hand, the propellers 16, 16' are in reverse pitch when the rotational speed of the engines 12, 12' falls by the said 500 revolutions per minute, then the abutment member 92 contacts the abutment members 91, 91'. This causes the links 22, 22' to move towards the left, whereby to reduce the said reverse pitch towards zero pitch and hence to reduce the power required to drive the propellers.

If, therefore, the rotational speed of the engines 12, 12' should fall by the said 500 revolutions per minute, the power required to drive the propellers 16, 16' will be reduced and the reduced load on the engines will enable the rotational speed of the engines to be restored to the desired value. Accordingly the power supply to the lift fans 11 will be maintained substantially constant to enable them to maintain the air cushion satisfactorily.

It will be appreciated that the spring boxes 26, 32, permit the link 25 and linkage 31 to be moved without straining the levers 27, 33.

When starting, the power control lever 51 is placed in the idling position, the clutch 15 is disengaged, and the blades of the propellers 16, 16' are set at zero pitch by the pitch control lever 27. The trim levers 45, 45' are set by the operator in accordance with day temperature and the shut-off cock levers 37, 37' are moved to the open position. The engines 12, 12' are then started and the power control lever 51 is moved to a position corresponding to a desired rotational speed of the engines 12, 12'. This movement of the power control lever 51 alters the positions of the movable abutment members 72, 72a and hence controls the loading on the springs 71, 71a.

The clutch 15 is now engaged and the lift fans 11 will produce the air cushion required to lift the aircraft.

If the rotational speed of the engines 12, 12' increases or falls below the value set by the spring 71, the valve member 65 will be moved to the left or right respectively, whereby the piston 52 will be moved to the right or left respectively so as to reduce or increase the fuel supply to the engines. Moreover, as already explained, if the said rotational speed falls by 500 revolutions per minute below the said value, the pitch of the blades of the propellers 16, 16' will be reduced.

In order to move the aircraft forwardly, the operator moves the pitch control lever 27 to increase the pitch of the blades of the propellers 16, 16' and if he desires to turn the aircraft he moves the yaw control lever 33 towards the left or right as the case may be.

The provision of the free wheels 13, 13' allows the aircraft to be operated on one engine only. The clutch 15 may, moreover, be disengaged to allow the aircraft to be operated as a boat in, for example, harbours where spray from the lift fans 11 may annoy other harbour users.

In each of FIGURES 3 and 4 there is shown a broken away diagrammatic sectional view of a part of a power plant.

The power plants of FIGURES 3 and 4 are modifications of that shown in FIG. 2 and for this reason they will not be described in detail. In FIGS. 3 and 4, however, parts of the power plants which correspond to like parts in FIG. 2 are given the same reference numerals but with the addition of the suffixes *b* and *c* respectively.

In the FIG. 3 arrangement, the ram 53 and unit 56 of the FIG. 2 arrangement are dispensed with, while the conduits 77b, 80b of the unit 55b, instead of communicating with the left and right hand sides of the piston 52 of the ram 53 as in the FIG. 2 arrangement, communicate with the right and left hand sides of piston 81b of ram 82b. The ram 82b operates in the same way as the ram 82 of the FIG. 2 arrangement. That is to say operation of the ram 82b may cause engagement between the abutment members 90b, 89b or between the abutment member 92b and the abutment members 91b, 91b'.

In the FIG. 3 arrangement, moreover, the lever 85b, which is mounted on a pivot 94, is provided, at its end remote from the abutment member 90b, with an abutment member 95. The abutment member 95 engages an abutment member 96 in a guide 97, the abutment member 96 being urged into engagement with the abutment member 95 by a spring 100. The abutment member 96 is mounted on a rod 101 which is pivotally connected to link 47b.

The FIG. 3 arrangement operates in a manner closely similar to that of FIG. 2. That is to say, if the rotational speed of the engines rises beyond the value set by the loading on the spring 71b, the governor weights 63b will cause the valve member 65b to move towards the left and this will cause the piston 81b to move towards the left. The lever 85b will therefore move anticlockwise about its pivot 94 and the rod 101 will accordingly move towards the right and will cause rightward travel of the link 46b. As a result the fuel supply to the engines will be reduced, and their rotational speed will therefore fall.

If, on the other hand, the rotational speed of the engines falls below the said value, the governor weights 63b will move so as to enable the valve member 65b to be moved towards the right by the spring 71b. This will cause the piston 81b to move towards the right. The lever 85b will therefore move clockwise about its pivot 94 and the rod 101 will accordingly move towards the left. This will cause leftward travel of the link 46b, where the fuel supply to the engines is increased.

If this increase in the fuel supply to the engine does not prove sufficient to restore their rotational speed to the said value, and if the rotational speed drops beneath this value, the said clockwise movement of the lever 85b will continue until there is engagement between the abutment members 90b, 89b (or between the abutment members 91b, 91b', 92b, as the case may be). This will cause movement of the links 22b, 22b' in a direction to reduce the pitch of the propeller blades.

In the FIG. 4 arrangement, the unit 56 of the FIG. 2 arrangement is dispensed with, while the conduits 77c, 80c, instead of communicating with opposite sides of the piston 52, communicate with the left hand sides of the pistons 52c, 81c respectively. The right hand sides of the pistons 52c, 81c communicate with each other by way of a conduit 103.

The FIG. 4 arrangement operates in a manner closely similar to that of FIG. 2. That is to say, if the rotational speed of the engines rises beyond the value set by the loading on the spring 71c, the governor weights 63c will cause the valve member 65c to move towards the right. This will cause the pistons 52c, 81c to move towards the right and left respectively. The rightward travel of the piston 52c will cause rightward travel of the link 46c whereby to reduce the fuel supply to the engines.

If, on the other hand, the rotational speed of the engines falls below the said value, the governor weights 63c will move so as to enable the valve member 65c to be moved towards the right by the spring 71c. This will cause the pistons 52c, 81c to be moved towards the left and right respectively. The leftward travel of the piston 52c will cause like travel of the link 46c, whereby the fuel supply to the engines will be increased.

If this increase in the fuel supply to the engines does not prove sufficient to restore their rotational speed to the said value, and if the rotational speed drops say 500 revolutions per minute beneath this value, the said rightward travel of the piston 81c will cause the abutment member 90c to contact the abutment member 89c (or as the case may be, the abutment member 92c to contact the abutment members 91c, 91c'). This will cause movement of the links 22c, 22c', in a direction to reduce the pitch of the propeller blades.

In this arrangement the margin of 500 r.p.m. is chosen due to the manufacturing limitations in ensuring that one of the ports controlled by the value member 65c is closed exactly as the other is opened.

I claim:

1. A ground effect aircraft comprising at least one variable pitch propeller effecting propulsion of the ground effect aircraft, at least one lift fan providing an air cushion for the ground effect aircraft, at least one engine operatively connected to and supplying power for said propeller and lift fan respectively, power control means operative in response to change in rotational speed of said engine for tending to maintain the speed of the engine at a predetermined value, and power reduction means for reducing the pitch of the propeller whenever the speed of the engine falls to a predetermined extent below the said predetermined value, whereby the power supply to the lift fan may be maintained substantially constant.

2. A ground effect aircraft comprising at least on variable pitch propeller, at least one lift fan providing an air cushion for said ground effect aircraft, at least one engine operatively connected to and supplying power for said propeller and lift fan respectively, speed responsive means at least part of which controls the fuel supply to the engine in dependence upon the rotational speed of the engine for maintaining the speed of the engine at a predetermined value, power reduction means for reducing the pitch of said propeller whenever the speed of the engine falls to predetermined extent below the said predetermined value, and a lost motion connection connected to at least part of the speed responsive means and to the power reduction means to ensure that the power reduction means is moved by the speed responsive means only when the rotational speed of the engine has fallen to the said predetermined extent, whereby the power supply to said lift fan may be maintained substantially constant.

3. A ground effect aircraft comprising at least one variable pitch propeller, at least one lift fan providing an air cushion for the ground effect aircraft, at least one engine operatively connected to and supplying power for said propeller and lift fan respectively, a ram which controls the fuel supply to the engine, speed responsive means at least part of which controls the position of the ram and hence the fuel supply to the engine in dependence upon the rotational speed of the engine for maintaining the speed of the engine at a predetermined value, power reduction means for reducing the pitch of said propeller whenever the speed of the engine falls to a predetermined extent below the said predetermined value, and a lost motion connection connected to at least part of the speed responsive means and to the power reduction means to ensure that the power reduction means is moved by the speed responsive means only when the rotational speed of the engine has fallen to the said predetermined extent, whereby the power supply to the lift fan may be maintained substantially constant.

4. A ground effect aircraft comprising at least one variable pitch propeller, at least one lift fan providing an air cushion for the ground effect aircraft, at least one engine operatively connected to and supplying power for said propeller and lift fan respectively, a first ram which controls the fuel supply to the engine, speed responsive means at least part of which controls the position of the first ram and hence the fuel supply to the engine in dependence upon the rotational speed of the engine for maintaining the speed of the engine at a predetermined value, power reduction means for reducing the pitch of said propeller whenever the speed of the engine falls to a predetermined extent below the said predetermined value, a second ram connected to and controlled by a part of the speed responsive means, and a lost motion connection connected to the second ram and to the power reduction means to ensure that the power reduction means is moved by the speed responsive means only when the rotational speed of the engine has fallen to the said predetermined extent, whereby the power supply to said lift fan may be maintained substantially constant.

5. A ground effect aircraft as claimed in claim 4 in which the speed responsive means comprise two governors which respectively control the positions of the said two rams.

6. A ground effect aircraft as claimed in claim 4 in which the speed responsive means is arranged to adjust a valve member which controls the supply of an hydraulic liquid to opposite faces of the respective rams, the engine being arranged to drive a pump for pressurising the said hydraulic liquid supply.

7. A ground effect aircraft comprising at least one variable pitch propeller, at least one lift fan adapted to provide an air cushion for the ground effect aircraft, at least one engine which is arranged to supply power for the operation of the propeller and lift fan, a ram which controls the fuel supply to the engine, speed responsive means at least part of which controls the position of the ram and hence the fuel supply to the engine in dependence upon the rotational speed of the engine for maintaining the speed of the engine at a predetermined value, power reduction means for reducing the pitch of the propeller whenever the speed of the engine falls to a predetermined extent below the said predetermined value, and a lost motion connection connected to the ram and to the power reduction means to ensure that the power reduction means is moved by the speed responsive means only when the rotational speed of the engine has fallen to the said predetermined extent, whereby the power supply to the lift fan may be maintained substantially constant.

References Cited by the Examiner

UNITED STATES PATENTS

| 1,345,726 | 7/20 | Wilson | 170—160.16 |
| 1,883,929 | 19/32 | Johnson et al. | 60—6 |
| 2,212,465 | 8/40 | Baldwin | 60—97 |
| 3,000,445 | 9/61 | Stuart | 170—135.22 |

FOREIGN PATENTS 895,057   4/62   Great Britain.

JULIUS E. WEST, *Primary Examiner.*